United States Patent [19]

Schreiner

[11] 4,440,279
[45] Apr. 3, 1984

[54] CONTROL SYSTEM OR METHOD FOR A FRICTION DEVICE SUCH AS A CLUTCH OR BRAKE

[75] Inventor: Friedrich Schreiner, Kehlen-Reute, Fed. Rep. of Germany

[73] Assignee: Zahnradfabrik Friedrichshafen AG, Friedrichshafen, Fed. Rep. of Germany

[21] Appl. No.: 296,564

[22] Filed: Aug. 26, 1981

[30] Foreign Application Priority Data

Aug. 29, 1980 [DE] Fed. Rep. of Germany ....... 3032558

[51] Int. Cl.³ .................. F16D 13/75; F16D 13/58
[52] U.S. Cl. .......................... 192/30 W; 188/1.11; 192/52; 192/91 A; 192/111 A
[58] Field of Search .............. 192/30 W, 52, 91 A, 192/111 A, 0.075; 188/1.11; 116/208; 340/52 A

[56] References Cited

U.S. PATENT DOCUMENTS

| 4,023,660 | 5/1977 | Dickinson | 192/52 X |
| 4,086,994 | 5/1978 | Hirosawa et al. | 192/0.075 X |
| 4,091,902 | 5/1978 | Hamada | 192/0.076 |
| 4,172,505 | 10/1979 | Rabus et al. | 192/52 X |
| 4,262,784 | 4/1981 | Sibeud | 192/52 |

FOREIGN PATENT DOCUMENTS

| 1682856 | 2/1954 | Fed. Rep. of Germany . |
| 1053794 | 3/1959 | Fed. Rep. of Germany ... 192/30 W |
| 2523229 | 12/1976 | Fed. Rep. of Germany . |
| 2640088 | 3/1978 | Fed. Rep. of Germany ... 192/30 W |
| 2842736 | 4/1980 | Fed. Rep. of Germany . |

OTHER PUBLICATIONS

AEG brochure, Oct. 1960.
AEG brochure, Aug. 1962.

Primary Examiner—Rodney H. Bonck
Attorney, Agent, or Firm—Karl F. Ross; Herbert Dubno

[57] ABSTRACT

A clutch or brake control system and method generates an electrical signal upon maximum torque transmission between the relatively displaceable parts of the friction device. This signal can be used as a reference point, changing with each application of the clutch or brake and with wear of the friction members thereof, which is utilized to trigger a controlled clutch or brake application process and may also be used to signal the end of a rapid-closure operation. Electronic circuitry is provided to store and process this signal.

12 Claims, 3 Drawing Figures

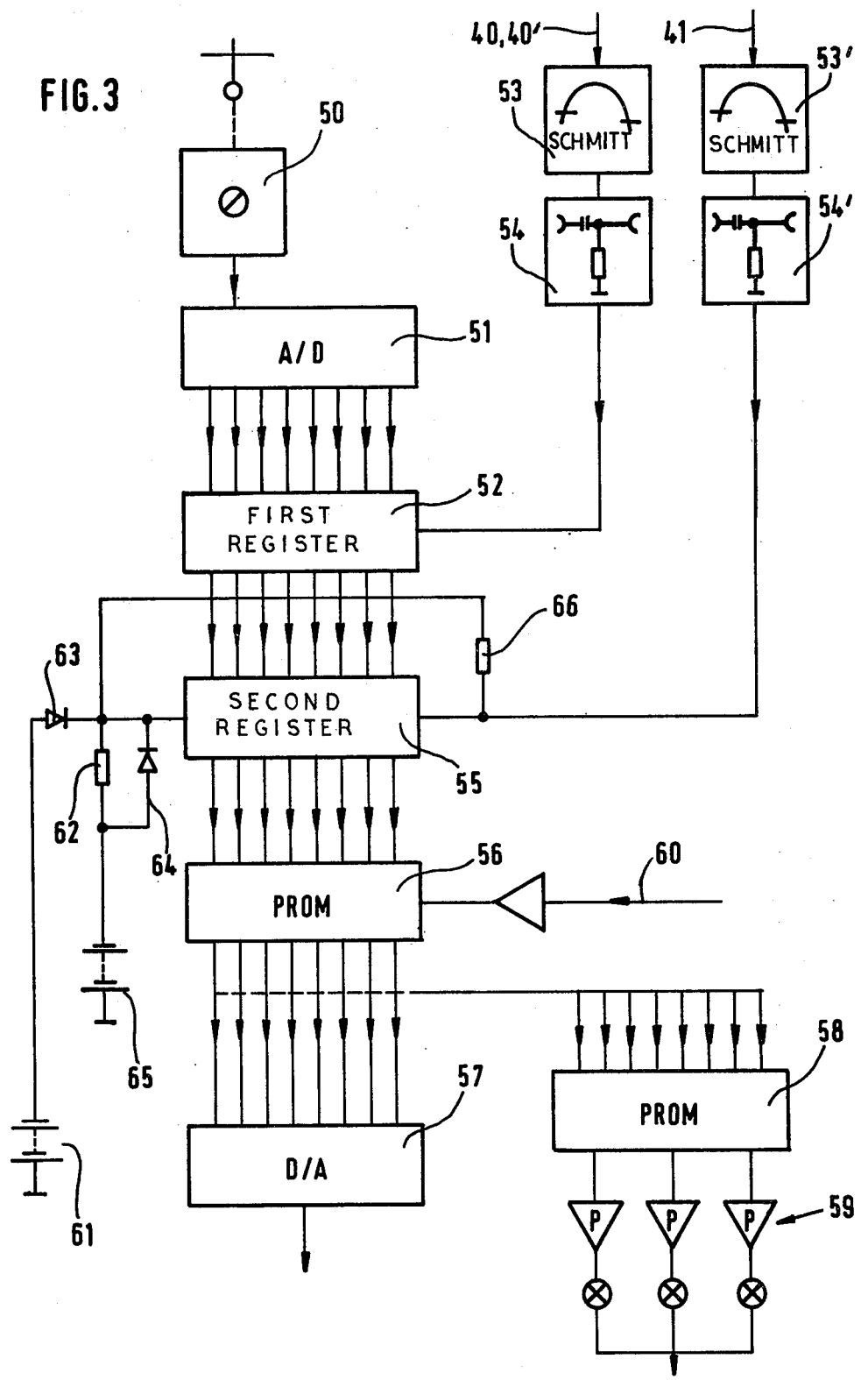

CONTROL SYSTEM OR METHOD FOR A FRICTION DEVICE SUCH AS A CLUTCH OR BRAKE

FIELD OF THE INVENTION

My present invention relates to a control method or system for a friction device such as a clutch or brake and, more particularly, to a displacement-responsive control system for such purposes.

BACKGROUND OF THE INVENTION

Friction devices such as clutches or brakes, especially for automotive vehicle applications, e.g. for the shifting of a multispeed transmission under load, generally comprise two relatively movable members, one of which is hydraulically displaceable, (i.e. is a piston or is coupled to a piston) which are urged toward one another (hydraulically or by spring force) to bring the two movable members or parts coupled therewith into frictional engagement.

This principle applies to single disk, multiplate and other clutches and brakes.

Before full engagement of the friction device, the movable member has, therefore, a certain axial displacement and, upon such engagement, there is practically no further relative movement between the two members, i.e. the two members are coupled for full torque transmission between them.

Friction devices of this type may have a controlled engagement, i.e. until there is full mutual coupling of the two members, it may be desirable to apply the axial pressure in a controlled manner so as to operate under predetermined friction characteristics, permit a certain amount of controlled slip, or prevent sudden coupling of the two members.

Friction devices of this type, moreover, are subject to wear, i.e. linings, friction surfaces and the like tend to reduce in thickness with use so that the displacement of the movable member until initial engagement and full engagement of the clutch or brake will vary in a progressive manner.

Friction clutches and brakes of the type with which the present invention is concerned may be any torque-transmitting device of the type described, whether intended to couple two shafts together or to brake rotation of a shaft.

For example, they may be used with considerable effectiveness in multispeed transmissions which are shiftable under load having a number of planetary gear sets which can be coupled together, to various shafts or partly immobilized utilizing hydraulically operated clutches and brakes with controlled coupling of the respective members so that, for example, the load need never be fully disconnected from the drive. Such transmissions are therefore shiftable under load.

Friction devices such as clutches and brakes have, in the past, been equipped with hydromechanical devices or elements which responded to the displacement of the movable member, e.g. to compensate for wear. However, these devices have not been found to be fully satisfactory when the controlled application of the friction pressure is desirable between the point of initial frictional interengagement and full frictional coupling. In addition, the mechanical or hydraulic adjusting systems are relatively complex, expensive, prone to wear and unreliable unless effective maintenance procedures are utilized.

OBJECTS OF THE INVENTION

It is the principal object of the present invention to provide an improved method of controlling a friction device such as a brake or clutch which utilizes simpler means than has hitherto been required and which affords more reliable control, especially with respect to the controlled application of the frictional force or the controlled coupling of the two relatively movable members.

Another object of the invention is to provide an improved control system for such clutches and brakes whereby drawbacks of earlier systems are obviated.

SUMMARY OF THE INVENTION

These objects and others which will become apparent hereinafter are attained, in accordance with the present invention, in a system of the aforedescribed type in which the friction device, i.e. the clutch or brake, comprises a pair of relatively rotatable members capable of frictional coupling upon axial displacement of at least one of these members.

According to the invention, means is provided for generating an electrical signal at the point in the axial displacement at which the maximum torque transmission is detected and this point is recorded or stored as a reference point for a control process regulating the frictional interengagement for a subsequent operation of the device.

Thus, in accordance with the method of the invention, the torque transmission between the two members is monitored and the maximum in this torque transmission during a previous engagement of the device is recorded to signal the reference position of the movable member in the form of an electrical output and a subsequent application of the device is controlled utilizing this recorded or registered point as a reference point.

For example, if it is known that for a given distance prior to full engagement of the clutch or brake, the hydrualic pressurization should be controlled to obtain controlled frictional interengagement, at exactly this distance prior to the reference position recorded in each previous clutch or brake operation cycle, the clutch or brake pressurization control program will be initiated.

Obviously this arrangement compensates automatically for wear since the reference point will advance as the brake or clutch linings reduce in thickness because of such wear.

While mechanical, hydraulic or hydromechanical adjusting devices are sensitive to friction, wear and variations in pressure themselves, the system of the present invention in which an electrical signal is generated in a contactless manner to signal the maximum torque transmission is far more reliable and accurate. Wear of the monitoring system, therefore, is eliminated as a factor in the control or regulation process.

According to another feature of the invention, the reference point, which defines the control point in the manner previously described, since the control point is precisely the aforementioned predetermined distance ahead of the reference point, can also be used to accelerate the clutch or brake operating process if the fluid supply to the piston cylinder is effected at the maximum rate until the control point is reached. Thus, over the distance corresponding to the fully open clutch or brake and the point at which frictional coupling commences, the piston is displaced at maximum speed.

According to yet another feature of the invention, the memory, which not only is provided with means for storing each reference point upon detection of the maximum torque for use in a succeeding control process, and the parameters of the control process to be effected as well as the predetermined distance mentioned previously, also registers or records a maximum-wear point corresponding to the point to which the linings can be allowed to wear to the maximum permissible extent.

When this point coincides with the reference point, according to the invention, an optical or acoustical (alert) signal can be generated to warn the operator.

It is also possible to provide a signal or data output as this wear point is approached, reached or exceeded so that the state of wear of the clutch or brake can be continuously monitored.

According to another feature of the invention, the monitoring of the displacement of the movable member is effected by juxtaposing primary and secondary coils so as to be flux-linked and interposing between these coils a cup-shaped member to a greater or lesser extent depending upon the axial displacement of the movable clutch or brake member. The cup can interfere with the inductive coupling of the coils so that the output of the secondary coil will be a function of the axial displacement.

It has been found to be advantageous to provide means responsive to the relative rotation of the two members for enabling the electronic circuitry to record the reference point when relative axial displacement of the two members terminates, i.e. when there is full torque coupling or frictional interengagement between the two members. This device for measuring relative rotation can also include primary and secondary coils which can be flux-linked and which can be separated by a member. When two such coils are provided, each coupled to the respective member, the two signals which result can be processed in the electronic circuitry mentioned previously.

It has been found to be of particular advantage to provide an analog/digital converter which receives the displacement signal, and a first memory or storage to which this signal is fed, the first memory being enabled by a signal representing maximum torque transmission and derived from a Schmitt trigger through a differentiator serving to reduce the pulse width.

Another signal representing the open condition of the clutch or brake and likewise processed through a Schmitt trigger and a differentiator enables a second memory which operates with a programmable read-only memory programmed with the fixed-distance, control point and pressurization-process data, the output of this memory being delivered to a digital/analog converter for operating the pressure regulator of the clutch or brake.

A separate programmable read-only memory may store and process data regarding wear.

BRIEF DESCRIPTION OF THE DRAWING

The above and other objects, features and advantages of the present invention will become more readily apparent from the following description, reference being made to the accompanying drawing in which:

FIG. 3 is a block diagram of a circuit which can be used for carrying out the invention.

SPECIFIC DESCRIPTION

Figure 1:
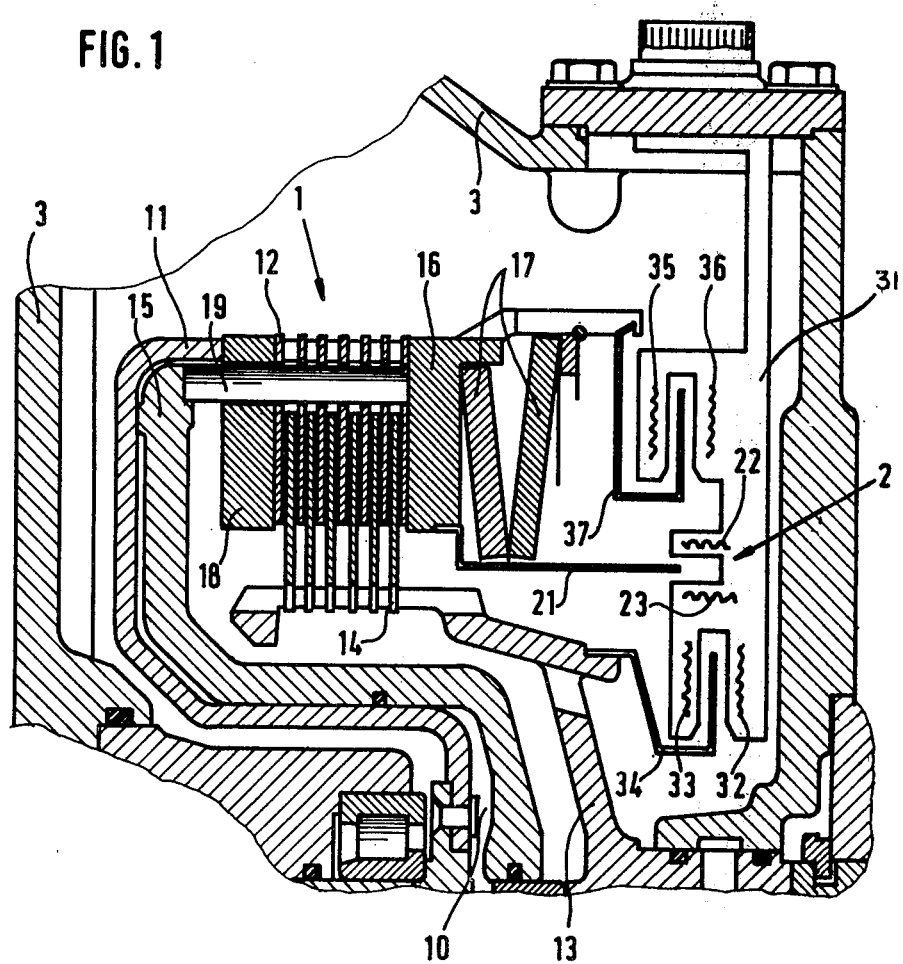
FIG. 1 is a fragmentary axial section through a clutch embodying the invention and showing the displacement and motion pick-ups in highly diagrammatic form.

FIG. 1 shows a clutch 1 with an external disk support 11 acting as the drive flange and external disks 12, an internal disk support 13 acting as the output flange and internal disks 14, a pressure piston 15 between the external disk support and the internal disk support for opening the clutch and a closing piston actuated by springs 17 for shifting the piston in a clutch-closing direction.

To the closing piston 16 of the clutch 1 there is fastened a cup-shaped body 21 following the axial movement of this pressure piston 16. The axial support of the disk pack 12, 14 is provided by an end disk 18. Force transmission from the pressure piston 15 for opening of the clutch 1 on the side of the closing piston 16 facing away from the springs 17 takes place via bolts 19.

A support 31 detachably connected with the housing 3 supports a primary coil 22 and a secondary coil 23 which form the motion pick-up 2 together with the cup-shaped body 21. In addition there are fastened either on or in the support 31 the fixed primary 32 and secondary coils 33 for ascertaining the output speed and the primary 35 and secondary 36 coils for the drive speed. Toothed disks 37, 34 disposed between the respective primary and secondary coils are fastened to the external disk support 11 or to the internal disk support 13. When the clutch is closed, as shown, the spring 17 urges the closing piston 16 against the disk pack 12, 14 which is supported by the end disk 18. The chamber 10 is not pressurized and the cup-shaped body 21 of the motion pick-up 2 only breaks the homogeneous stray field between the primary and secondary windings very slightly so that a comparatively large voltage is produced. The depth of penetration of the cup-shaped body 21 in the gap between the primary 22 and secondary 23 coils in the case of a closed clutch must be dimensioned such that at least the entire admissible wear of the clutch, on the disks, is taken into account, so that even in the case of a clutch which is worn to an extent which is still admissible there is an increase of the voltage in the secondary winding.

In the end position of the closing piston in each case, therefore in the end position corresponding to the complete torque transmission and which also has the greatest voltage for the closing process, this electrical signal is detected and stored and is used as the reference point 40 for the subsequent defined clutch actuation. In order to open the clutch 1 the chamber 10 is pressurized. The pressure piston 15 moves in the direction of the closing piston 16 and urges the latter via the bolts 19 against the pressure of the spring 17 back to the point 41. Simultaneously the cup-shaped body 21 is inserted more deeply in the slot of the motion pick-up 2 so that there is a smaller voltage in the secondary coil.

Figure 2:
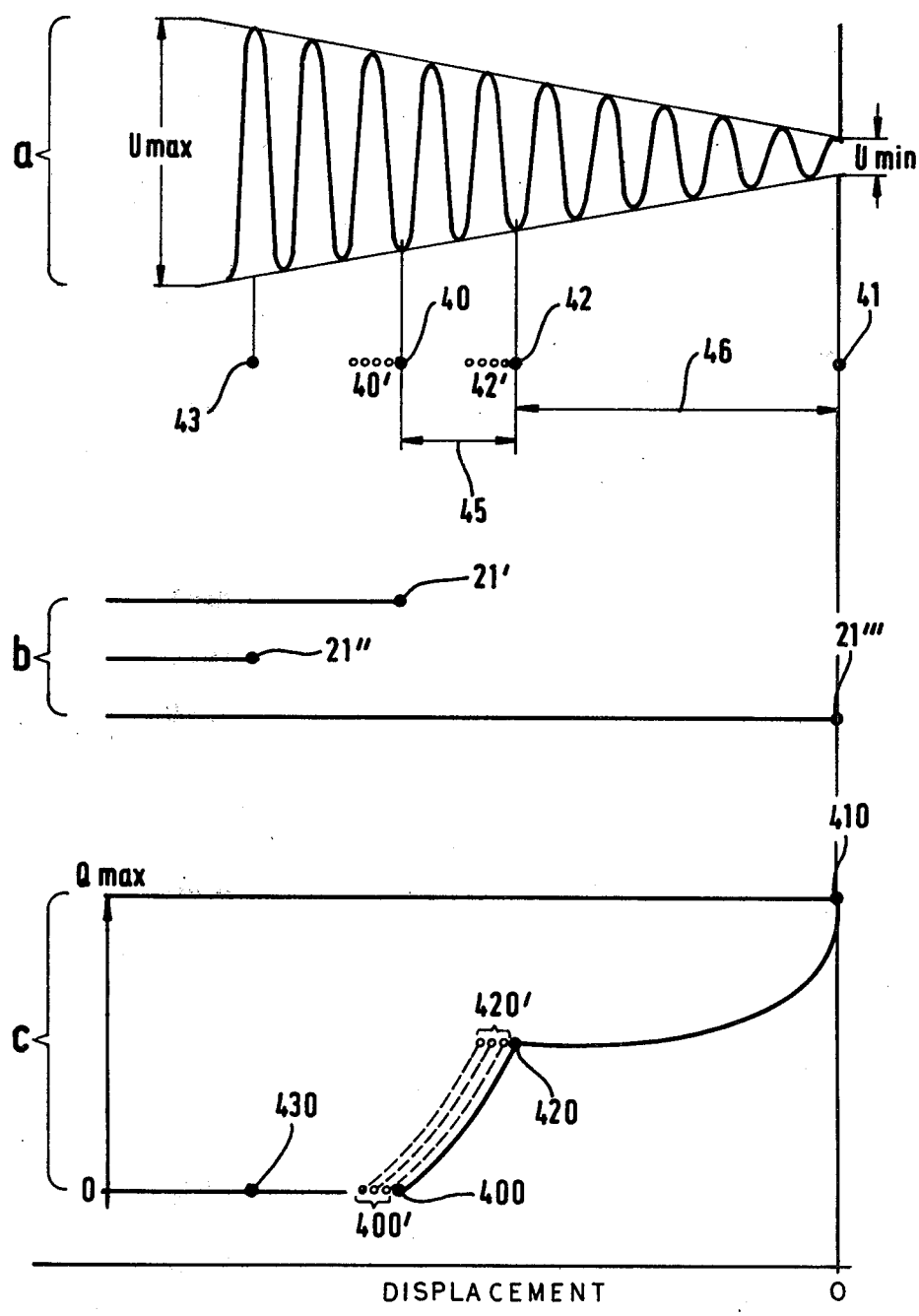
FIG. 2 is a graph having sections (a, b, and c) representing, respectively, electrical output of the displacement monitor, the displacement points and the controlled application of clutch pressure along the ordinate with the displacement plotted along the abscissa.

Graph a of FIG. 2 shows the voltage U in the secondary coil with respect to the path of the closing piston (graph b) in which the point 21' corresponds to the position of the cup-shaped body 21 in the case of the fully closed clutch. With increasing wear the covering of the primary winding is reduced so that the voltage in this closed position is increased. 21" shows a position corresponding to the greatest admissible wear in the clutch. The position 21''' corresponds to the opened clutch having the correspondingly greatest covering of the secondary coil.

Graph c shows the pressure development provided over the path. Points 400, 400' to 430 correspond to points 40, 40' to 43 in graph a.

If the clutch is closed, the pressure chamber 10 is partially depressurized. The springs 17 which are urged together comparatively strongly effect a rapid closing movement from point 41—corresponding to the opened clutch—to point 42 at which the disks are applied to begin a predetermined closing process. Depressurization now follows in a regulated or controlled manner. At reference point 40' the clutch is again closed and transmits the full torque and this reference point 40' which deviates slightly from the previously stored reference point 40, i.e. by the amount of the wear in the clutch, is stored for a further actuation cycle.

The distance 45 for the regulated or controlled venting from point 42, 42' to the reference point 40, 40' is always constant while the wear causes the extension of the rapid distance 46 from point 41 to point 42, 42'.

The reference point 40, 40' shifts during each actuation of the clutch, even if these steps are very small, in the direction of the wear mark 43. In this respect it is possible, by suitable programming of the approach towards this wear mark, to show that it has been reached and exceeded by suitable displays and also to obtain further corresponding data.

FIG. 3 shows the circuit arrangement for the distance measuring device 2 in which the voltage U proportional to the distance is continuously supplied from any type of measuring transducer 50—for example as described with reference to FIG. 1—to an analog/digital converter 51. A control signal from the regulator (not shown) which corresponds to the distance mark 40, 40' graph a of FIG. 2 is conveyed via a Schmitt trigger 53 and a pulse reducer (differentiator) 54 and supplied to the first memory and effects storage of the distance mark (reference point 40, 40'), therefore the point at which the clutch transmits the full torque. This reference point is also the point having the highest voltage U proportional to the distance in each switching cycle respectively. The two halves of the clutch, i.e. drive and output, also have the same speed at this reference point in such a way that this point is very easy to represent.

On opening of the clutch the pressure chamber 10 is acted upon (FIG. 1) and the regulator supplies, after it has completely opened (Point 41, 410, FIG. 2), a signal to the second memory 55 for the take-over of the value maintained in the first memory 52 so that this first memory or register 52 is prepared again for a further switching cycle for the storage of the reference point 40'. The accurage signal transmission is in this respect again ensured—as in the case of the first memory or register 52—by a Schmitt trigger 53' and a pulse reducer 54 (differentiator). From the reference point 40, 40' for the completely closed clutch 1 which is re-ascertained during each switching cycle and stored in the second memory or register 55 and the spacing 45 graph a valid for all cycles and the pressure development between point 420 and 400 or 420' and 400' (graph c) in the fixed value memory 56 (PROM) a corresponding correction value is provided, is again converted in a digital/analog converter 57 and is supplied as a control value or a correction to the control value of a regulator device (not shown) controlling the pressurization of chamber 10.

If for example a further fixed value memory 58 is provided it is possible to program a wear point 43 (graph a), and upon the achievement of which, i.e. upon reference point 40' coinciding with point 43 of the wear mark, to trigger a corresponding signal or command. Naturally it is simultaneously possible to display during each cycle whether the wear is still in a permissible range or whether the reference point 40' is in the critical area or whether the wear mark has been passed, as shown in FIG. 3 using the alert or display output 59. The fixed value memory 56 may be stored in accordance with the required predetermined pressure increase or decrease for a development which may be reproduced and is continuously activated with the second memory 55 so that during achievement of the distance mark—reference point 40, 40' minus distance 45, therefore at point 42 which corresponds to the point of the disks provided—the predetermined actuation of the clutch 1 may begin as a result of pressure increase or decrease.

It is also possible to actuate the fixed value memory 56 via the input 60. In addition the fixed value memory 56 may be rapidly exchanged so that several programs for closing/opening of a clutch/brake may be maintained ready for different corresponding conditions.

The power supply is provided from the power source 61 of the electric-current supply. In order to maintain the storage of the reference point 40, 40' during changes of this power supply or in the case of particular stoppages, the second memory 55 is provided with its own battery 65 (NiCd battery) which is charged via the charging resistance 62 from the electric-current supply. The power supply in the case of power failure takes place via the battery 65 associated with the second memory 55 and the second diode 64 associated with the second memory 55 itself, while in normal operation the power supply both to the second memory 55 and the charging resistance 62 takes place via the first diode 63. The charging voltage of the power source 65 associated with the memory must clearly therefore be below the normal feed voltage of the power supply 61 of the electric-current supply.

In order to prevent undesired data during the "off" operation as a result of static voltages, the control input of the second memory 55 must be charged via a resistance 66 (from the regulator) and connected to the power supply of the second memory 55.

The electrical detection of the reference point 40, 40' in the motion pick-up 2 is not limited to the method shown in the example and in the FIGS. based on an eddy current pick-up, but may also be carried out using, for example, a differential transformer or shortcircuiting ring pick-up.

It will be apparent from the foregoing that the Schmitt trigger 53 serves to enable the first register 52 to store therein a displacement value delivered by the analog/digital converter 51 corresponding to the instant at which relative rotation of the two clutch members 11, 13 terminates, i.e. the new reference point 40' for full clutch actuation.

This is transferred to the second memory or register 55 as the new reference point for the next clutch operation cycle and it is at this point that the predetermined fixed distance 45 is subtracted (having been stored in the memory 56 originally) to establish the control point 42' at which controlled application of clutch pressure occurs. In the embodiment described, the hydraulic pressure functions to deenergize the clutch and to control the application of the spring force although the same principles apply to systems in which the clutch is engaged by pressurization of the piston.

I claim:

1. A method of operating a friction device, namely, a clutch or brake having a pair of relatively rotatable members, at least one of which is axially displaceable to effect frictional coupling of said members, said method comprising the steps of:
   simultaneously monitoring the frictional coupling of said members and the axial displacement of said one of said members electrically and generating an electrical signal representing maximum frictional coupling of said members;
   registering in the form of an electrical signal data representing the point in the axial displacement of said one of said members corresponding to the maximum frictional coupling of said members;
   utilizing the registered signal to represent a reference point in the axial displacement of said one of said members and automatically, at a predetermined prerecorded distance ahead of said reference point for a succeeding cycle of operation of said device;
   regulating the frictional coupling of said members; and
   recording a new reference point at the conclusion of the frictional coupling of said members.

2. The method defined in claim 1, further comprising the steps of:
   recording data representing a maximum permissible wear point in the displacement of one of said members corresponding to the maximum allowable wear in friction surfaces between said members; and
   monitoring the position of said reference point relative to said wear point.

3. The method defined in claim 2, further comprising the step of generating an alert signal upon coincidence of said wear point and said reference point.

4. The method defined in claim 2, further comprising the step of displaying data representing the proximity of said reference point to said wear point.

5. The method defined in claim 2, further comprising the step of rapidly displacing said one of said members axially until a control point is reached in a subsequent cycle, said control point being disposed at a predetermined fixed distance ahead of said reference point as determined in a previous cycle of operation of said device.

6. A system for controlling a friction device, namely a clutch or brake having a pair of relatively rotatable members at least one of which is axially displaceable for frictional coupling of said members, said system comprising:
   means for monitoring the degree of frictional coupling of said members;
   signal-generating means responsive to said monitoring means for producing an electrical signal representing a reference point in the axial displacement of said one of said members upon maximum frictional coupling of said members for each actuation of said device;
   means for electrically storing said signal representing said reference point for each actuation of said device; and
   means for storing data representing a predetermined pattern of actuation of said device, and means for initiating said pattern of actuation of said device at a control point in the displacement of one of said members located at a predetermined distance ahead of the stored reference point of a predetermined actuation cycle.

7. The system defined in claim 6, further comprising means storing data representing a wear point for maximum permissible wear of frictional surfaces between said members, and means for generating a signal upon the development of a predetermined relationship between the stored reference point and wear point.

8. The system defined in claim 6 wherein one of said members is provided with a primary coil and a secondary coil juxtaposed with said primary coil and forming said generating means, the other of said members being provided with a cup receivable between said coils whereby the flux coupling of said coils in a function of relative axial displacement of said members.

9. The system defined in claim 8, further comprising means for generating a signal representing the relative angular displacement of said members for monitoring the frictional coupling therebetween, the latter means including a pair of coils having a disk received therebetween.

10. The system defined in claim 6, further comprising means including:
    an analog/digital converter receiving an analog electrical signal representing the axial displacement of said one of said members;
    a Schmitt trigger circuit and a differentiator for generating an enabling signal upon maximum frictional coupling of said members;
    a first register receiving said enabling signal and connected to said analog/digital converter for storing said reference point;
    a second register connected to said first register and receiving said reference point for use in a subsequent actuation of said device;
    a programmable memory connected to said second register for determining a control point based upon data stored in said memory located a fixed distance ahead of said reference point and additionally storing data representing a predetermined actuation of said device from said control point to maximum friction coupling; and
    a digital/analog converter connected to said memory and connectable to a fluid-pressure source for controlling the actuation of said device.

11. The system defined in claim 10 wherein said second register is provided with an auxiliary power supply.

12. The system defined in claim 11, further comprising a resistance for charging a control input of said second register.

* * * * *